United States Patent
Lee et al.

(10) Patent No.: US 10,038,904 B2
(45) Date of Patent: Jul. 31, 2018

(54) METHOD AND APPARATUS FOR CONTROLLING TRANSMISSION OF COMPRESSED PICTURE ACCORDING TO TRANSMISSION SYNCHRONIZATION EVENTS

(71) Applicant: MEDIATEK INC., Hsin-Chu (TW)

(72) Inventors: Kun-Bin Lee, Taipei (TW);
Tung-Hsing Wu, Chiayi (TW);
Han-Liang Chou, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/031,281

(22) PCT Filed: Oct. 24, 2014

(86) PCT No.: PCT/CN2014/089477
§ 371 (c)(1),
(2) Date: Apr. 22, 2016

(87) PCT Pub. No.: WO2015/058718
PCT Pub. Date: Apr. 30, 2015

(65) Prior Publication Data
US 2016/0277735 A1    Sep. 22, 2016

Related U.S. Application Data

(60) Provisional application No. 61/895,454, filed on Oct. 25, 2013, provisional application No. 61/895,461, (Continued)

(51) Int. Cl.
*H04N 19/119* (2014.01)
*H04N 19/436* (2014.01)
(Continued)

(52) U.S. Cl.
CPC ........ *H04N 19/119* (2014.11); *H04N 19/115* (2014.11); *H04N 19/172* (2014.11);
(Continued)

(58) Field of Classification Search
None
See application file for complete search history.

(56) References Cited

U.S. PATENT DOCUMENTS 6,963,608 B1   11/2005  Wu
2006/0088094 A1*  4/2006  Cieplinski ........ H04N 21/23406
375/240.01

(Continued)

FOREIGN PATENT DOCUMENTS

CN       1633183 A      6/2005
CN     101053258 A     10/2007
(Continued)

OTHER PUBLICATIONS

Michael Horowitz et al., Generalized slices, Joint Collaborative Team on Video Coding (JCT-VC) of ITU-T SG16 WP3 and ISO/IEC JTC1/SC29/WG11 4th Meeting, Jan. 20-28, 2011, pp. 1-7, Document: JCTVC-D378, XP030047722, Daegu, KR.

(Continued)

*Primary Examiner* — Kim Vu
*Assistant Examiner* — Nathan Bloom
(74) *Attorney, Agent, or Firm* — Winston Hsu

(57) ABSTRACT

An image processing method includes at least the following steps: partitioning a picture into a plurality of slices, wherein each slice row in the picture includes at least one slice; generating a compressed picture by encoding each of the slices; and controlling at least one of start of transmission of encoded data of a slice row and end of the transmission of encoded data of the slice row according to a transmission synchronization event.

13 Claims, 5 Drawing Sheets

Related U.S. Application Data filed on Oct. 25, 2013, provisional application No. 61/904,490, filed on Nov. 15, 2013.

(51) Int. Cl.

| | | |
|---|---|---|
| *H04N 19/184* | (2014.01) | |
| *H04N 19/44* | (2014.01) | |
| *H04N 19/463* | (2014.01) | |
| *H04N 19/172* | (2014.01) | |
| *H04N 19/174* | (2014.01) | |
| *H04N 21/43* | (2011.01) | |
| *H04N 19/115* | (2014.01) | |
| *H04N 21/41* | (2011.01) | |
| *H04N 5/08* | (2006.01) | |

(52) U.S. Cl.
CPC ......... *H04N 19/174* (2014.11); *H04N 19/184* (2014.11); *H04N 19/436* (2014.11); *H04N 19/44* (2014.11); *H04N 19/463* (2014.11); *H04N 21/4122* (2013.01); *H04N 21/4302* (2013.01); *H04N 5/08* (2013.01)

(56) References Cited

U.S. PATENT DOCUMENTS

| | | | |
|---|---|---|---|
| 2006/0146928 A1 | 7/2006 | Wang | |
| 2008/0152020 A1 | 6/2008 | Kayashima | |
| 2009/0052537 A1* | 2/2009 | Burazerovic | G06K 9/3233 375/240.15 |
| 2010/0073574 A1 | 3/2010 | Nakajima | |
| 2010/0195741 A1 | 8/2010 | Chou | |
| 2011/0030025 A1* | 2/2011 | Bertonis | H04N 21/43637 725/118 |
| 2011/0038557 A1 | 2/2011 | Closset | |
| 2011/0051806 A1* | 3/2011 | Lee | H04N 19/159 375/240.03 |
| 2011/0149032 A1* | 6/2011 | Choi | H04N 13/0051 348/43 |
| 2012/0004960 A1* | 1/2012 | Ma | G06Q 30/0241 705/14.4 |
| 2012/0243602 A1 | 9/2012 | Rajamani | |

FOREIGN PATENT DOCUMENTS

| | | |
|---|---|---|
| CN | 102696229 A | 9/2012 |
| JP | 2000152174 A | 5/2000 |
| JP | 2009213110 A | 9/2009 |
| JP | 2013-31024 A | 2/2013 |
| WO | 2012060459 A1 | 5/2012 |
| WO | 2013018248 A1 | 2/2013 |
| WO | 2014199618 A1 | 12/2014 |

OTHER PUBLICATIONS

"International Search Report" dated Feb. 4, 2015 for International application No. PCT/CN2014/089477, International filing date:Oct. 24, 2014.

Katsutoshi Sawada et al., A 32 Mbit/s Component Separation DPCM Coding System for NTSC Color TV, IEEE Transactions on Communications, vol. COM-26, No. 4, Apr. 1978, pp. 458-465, XP055472568.

VESA Display Stream Compression (DSC) Standard Version 1.1, Aug. 1, 2014, pp. 1-125, XP030001644, © 2014 Video Electronics Standards Association.

\* cited by examiner

METHOD AND APPARATUS FOR CONTROLLING TRANSMISSION OF COMPRESSED PICTURE ACCORDING TO TRANSMISSION SYNCHRONIZATION EVENTS

CROSS REFERENCE TO RELATED APPLICATIONS

This application claims the benefit of U.S. provisional application No. 61/904,490 (filed on Nov. 15, 2013), U.S. provisional application No. 61/895,454 (filed on Oct. 25, 2013), and U.S. provisional application No. 61/895,461 (filed on Oct. 25, 2013). The entire contents of the related applications are incorporated herein by reference.

TECHNICAL FIELD

The disclosed embodiments of the present invention relate to transmitting compressed data over a transmission channel, and more particularly, to a method and apparatus for controlling transmission of a compressed picture according to transmission synchronization events.

BACKGROUND

A display interface may be disposed between an application processor (AP) and a display driver integrated circuit (DDIC) to transmit display data from the AP to the DDIC for further processing. When a display panel supports a higher display resolution, 2D/3D display with higher resolution can be realized. Hence, the display data transmitted over the display interface would have a larger data size/data rate, which increases the power consumption of the display interface inevitably. If the AP and the DDIC are both located at a portable device (e.g., a smartphone) powered by a battery device, the battery life is shortened due to the increased power consumption of the display interface.

Similarly, a camera interface may be disposed between a camera module and an image signal processor (ISP) to transmit multimedia data from the camera module to the ISP for further processing. The ISP may be part of an application processor. When a camera sensor with a higher resolution is employed in the camera module, the captured image data transmitted over the camera interface would have a larger data size/data rate, which increases the power consumption of the camera interface inevitably. If the camera module and the ISP are both located at a portable device (e.g., a smartphone) powered by a battery device, the battery life is shortened due to the increased power consumption of the camera interface.

Data compression may be employed to reduce the data size/data rate of data transmitted over a transmission interface such as the display interface or the camera interface. However, there may be certain requirements for decoding and transmission of the compressed data. Hence, there is a need for an innovative design which can meet the requirements while transmitting a compressed picture from an encoder side to a decoder side.

SUMMARY

In accordance with exemplary embodiments of the present invention, an image processing method for controlling transmission of a compressed picture according to transmission synchronization events and a related image processing apparatus are proposed.

According to a first aspect of the present invention, an exemplary image processing method is disclosed. The exemplary image processing method includes: partitioning a picture into a plurality of slices, wherein each slice row in the picture includes at least one slice; generating a compressed picture by encoding each of the slices; and controlling at least one of start of transmission of encoded data of a slice row and end of the transmission of encoded data of the slice row according to a transmission synchronization event.

According to a second aspect of the present invention, an exemplary image processing apparatus is disclosed. The exemplary image processing apparatus includes a compressor and an output interface. The compressor is configured to partition a picture into a plurality of slices, and generate a compressed picture by encoding each of the slices, wherein each slice row in the picture includes at least one slice. The output interface is configured to control at least one of start of transmission of encoded data of a slice row and end of the transmission of encoded data of the slice row according to a transmission synchronization event.

According to a third aspect of the present invention, an exemplary method of transmitting a compressed picture is disclosed. The exemplary method includes: partitioning a picture into multiple slices; encoding each of slices; and controlling transmission of compressed data of a vertical adjacent slice to synchronize with a synchronization event.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes applying data compression to a picture and then transmitting a compressed picture over a transmission channel. As the data size/data rate of the compressed picture is smaller than that of the original un-compressed picture, the power consumption of a transmission interface is reduced correspondingly. In addition, the data compression may be standardized by a Video Electronics Standards Association (VESA) display stream compression (DSC). Hence, in accordance with VESA DSC, there is a requirement requesting that the delay from the start of transmission to the start of decoding and the delay from the end of transmission to the end of decoding must be the same as one another and the same for each slice. The present invention further proposes controlling transmission of the compressed picture according to transmission synchronization events. For example, at least one of the start and the end of transmission of encoded data (i.e., compressed data) of a slice row (which may include one or more slices, depending upon the partitioning design of the picture) is intentionally aligned towards a transmission synchronization event. In this way, the requirement specified in VESA DSC may be partially or fully satisfied. Further details of the proposed image processing design with transmission synchronization event based control of compressed data transmission will be described as below.

Figure 1:
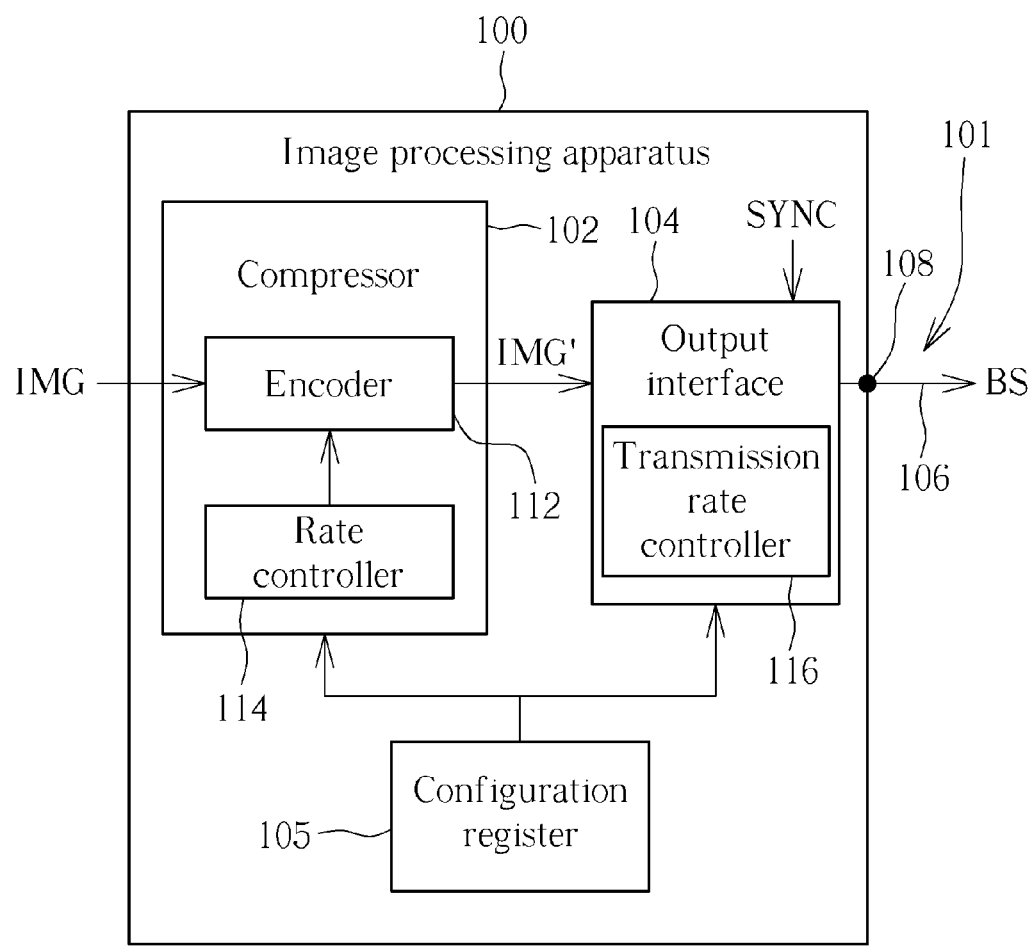
FIG. 1 is a block diagram illustrating an image processing apparatus according to an embodiment of the present invention.

FIG. 1 is a block diagram illustrating an image processing apparatus according to an embodiment of the present invention. The image processing apparatus 100 includes a compressor 102, an output interface 104, and a configuration register 105. It should be noted that only the circuit components pertinent to the present invention are shown in FIG. 1. In practice, the image processing apparatus 100 may be configured to have additional circuit components. The image processing apparatus 100 is located at an encoder side, and generates a bitstream BS to a decoder side through one transmission port 108 of a transmission interface 101. Hence, the bitstream BS is transmitted from the encoder side to the decoder side via a transmission channel 106 of the transmission interface 101.

In one exemplary implementation, the image processing apparatus 100 may be part of a camera module, and a picture IMG to be processed by the proposed image processing apparatus 100 may be derived from an output of a camera sensor implemented in the camera module. In addition, the transmission interface 101 may be a camera serial interface (CSI) standardized by a Mobile Industry Processor Interface (MIPI). Hence, the transmission port 108 is a camera port of the CSI. In a case where the camera module is coupled to a single image signal processor (ISP) through the transmission port 108 only, the picture IMG is one complete captured image generated from the camera sensor, and a single-port compressed data transmission is employed by the camera module. In another case where the camera module is coupled to multiple ISPs through multiple camera ports, the picture IMG is part of one complete captured image generated from the camera sensor. In other words, the camera module may be configured to have multiple image processing apparatuses 100 included therein. The image processing apparatuses 100 are used for processing different image regions of one complete captured image and transmitting compressed data of the different image regions to the ISPs, respectively. Therefore, the transmission port 108 is one of the camera ports of the CSI, and a multi-port compressed data transmission is employed by the camera module.

In another exemplary implementation, the image processing apparatus 100 may be part of an application processor (AP), and the picture IMG to be processed by the proposed image processing apparatus 100 may be generated at the AP. In addition, the transmission interface 101 may be a display serial interface (DSI) standardized by a Mobile Industry Processor Interface (MIPI). Hence, the transmission port 108 is one display port of the DSI. In a case where the AP is coupled to a single display driver integrated circuit (DDIC) through the transmission port 108 only, the picture IMG is one complete image to be displayed on a display screen driven by the DDIC, and a single-port compressed data transmission is employed by the AP. In another case where the AP is coupled to multiple DDICs through multiple display ports, the picture IMG is part of one complete image to be displayed on a display screen. In other words, the AP may be configured to have multiple image processing apparatuses 100 included therein. The image processing apparatuses 100 are used for processing different image regions of one complete image and transmitting compressed data of the different image regions to the DDICs, respectively. Different display areas of the display screen are driven by the DDICs, respectively. Therefore, the transmission port 108 is one of the display ports of the DSI, and a multi-port compressed data transmission is employed by the AP.

The configuration register 105 may be programmed to store a control setting used for configuring the compressor 102 and the output interface 104. In other words, behaviors of the compressor 102 and the output interface 104 depend on the control setting programmed in the configuration register 105. The compressor 102 receives the picture IMG, partitions the picture IMG into a plurality of slices, and generates a compressed picture IMG' by encoding each of the slices. After partitioning is applied to the picture IMG, the picture IMG may be regarded as having slice rows arranged vertically. Each slice row in the picture IMG includes at least one slice. The term "slice row" mentioned hereinafter may mean a single slice or a combination of slices arranged horizontally.

Figure 2:
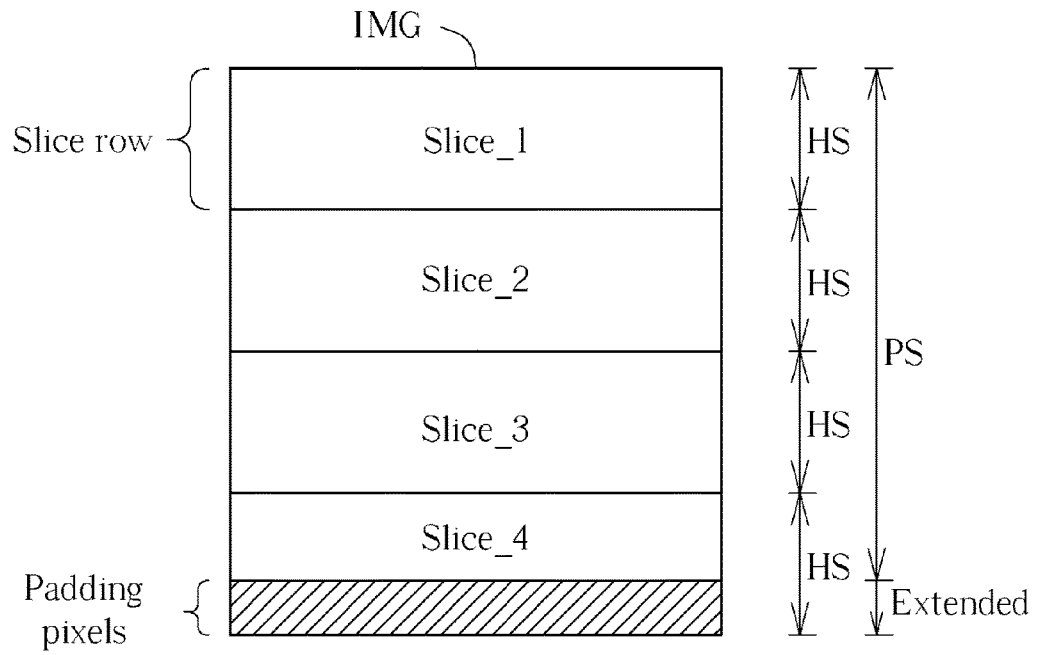
FIG. 2 is a diagram illustrating a first partitioning setting of a picture according to an embodiment of the present invention.

FIG. 2 is a diagram illustrating a first partitioning setting of the picture IMG according to an embodiment of the present invention. In this case, the compressor 102 partitions the picture IMG into four slices Slice_1, Slice_2, Slice_3, Slice_4 that are arranged vertically. It is possible that the original picture height PS of the picture IMG is not divisible by the slice height HS. The compressor 102 may add padding pixels below the last line (i.e., the last pixel row) of the picture IMG to serve as part of the slice Slice_4 with the slice height HS. In this way, each of the slices Slice_1, Slice_2, Slice_3, Slice_4 has the same slice height HS. After the pseudo picture region is added due to pixel padding, the picture height PS is extended to cover this pseudo picture region.

Figure 3:
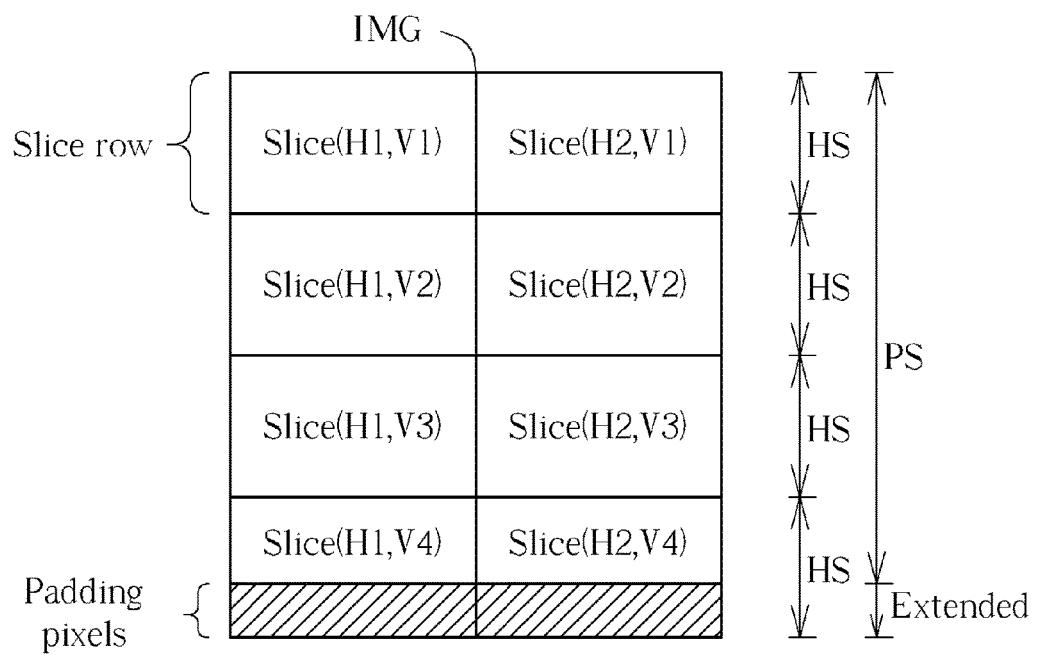
FIG. 3 is a diagram illustrating a second partitioning setting of a picture according to an embodiment of the present invention.

In this example shown in FIG. 2, each slice row includes a single slice only. However, it is possible that more than one slice is created in the horizontal direction. FIG. 3 is a diagram illustrating a second partitioning setting of the picture IMG according to an embodiment of the present invention. In this case, the compressor 102 partitions the picture IMG into eight slices including Slice (H1, V1), Slice (H1, V2), Slice (H1, V3), Slice (H1, V4) arranged vertically and Slice (H2, V1), Slice (H2, V2), Slice (H2, V3), Slice (H2, V4) arranged vertically. Similarly, the compressor 102 may add padding pixels below the last line (i.e., the last pixel row) of the picture IMG to serve as part of the slice Slice (H1, V4) and Slice (H2, V4), thereby making each of the slices has the same slice height HS. In this example, each slice row includes multiple slices arranged horizontally.

The number of lines (i.e., pixel rows) included in one slice is equal to the slice height HS. In addition, each slice includes a plurality of groups, and each group includes a plurality of pixels. For example, each group may be an m×n pixel block, where m and n are positive integers. When m=1, each group is a one-dimensional pixel block. When m>1, each group is a two-dimensional pixel block.

The compressor 102 outputs encoded data of each slice to the output interface 104 for transmission. It should be noted that when one slice row includes multiple slices, encoded data of the slices are multiplexed and then transmitted. Hence, encoded data of one slice row having a single slice only and encoded data of one slice row having multiple slices may be transmitted in the same way. For clarity and simplicity, the following assumes that first partitioning setting of the picture IMG is employed such that each slice row is one slice.

The output interface 104 is configured to control at least one of start of transmission of encoded data of a slice row and end of the transmission of encoded data of the slice row according to a transmission synchronization event SYNC. For example, the transmission synchronization event SYNC may be a horizontal synchronization event used to indicate that one line of the picture is transmitted. For another example, the transmission synchronization event SYNC may be a vertical synchronization event used to indicate that one entire picture is transmitted. It should be noted that, the first line of a current picture may start with a vertical synchronization event due to the end of a previous picture, and all other lines of the picture may start with a horizontal synchronization event due to the end of a previous line. In one exemplary embodiment of the present invention, the start of transmission of encoded data of any slice row in the picture IMG and/or the end of transmission of encoded data of any slice row in the picture IMG may be controlled to be synchronized with closest horizontal synchronization events. In another exemplary embodiment of the present invention, the start of transmission of encoded data of the first slice row in the picture IMG and/or the end of transmission of encoded data of the last slice row in the picture IMG may be controlled to be synchronized with closest vertical synchronization events; the end of transmission of encoded data of the first slice row in the picture IMG and/or the start of transmission of encoded data of the last slice row in the picture IMG may be controlled to be synchronized with closest horizontal synchronization events; and the start of transmission of encoded data of other slice rows in the picture IMG and/or the end of transmission of encoded data of other slice rows in the picture IMG may be controlled to be synchronized with closest horizontal synchronization events.

As shown in FIG. 1, the compressor 102 may include an encoder 112 and a rate controller 114, where the encoder 112 may perform lossy compression upon each slice, and the rate controller 114 may apply bit rate control to each compression operation to ensure that encoded data of a slice satisfies a bit budget allocated to the slice. In this embodiment, the rate controller 114 may employ a fixed rate control method, and the encoder 112 may generate the compressed picture IMG' through a lossy compression method with the fixed rate control method applied thereto. Hence, based on a desired compression ratio CR of the compressed picture IMG', a bit budget allocated to a slice row (which may include one or more slices, depending upon the employed partitioning setting of the picture) is determined, where $$CR = \frac{\text{Compressed data size}}{\text{Uncompressed data size}}.$$

In one exemplary design, the fixed rate control method is performed by the rate controller 114 such that each of the slices is assigned with the same bit budget calculated based at least partly on the picture size of the picture IMG and the desired compression ratio CR. Therefore, the ratio of the size of encoded data of a slice row to the size of original data of the slice row is equal to CR. Since the encoded data of the slice row is transmitted over the transmission channel 106, a transmission rate controller 116 implemented in the output interface 104 may refer to compression-related parameters (e.g., picture size and compression ratio) to adjust transmission rate and timing of the transmission channel 106 to thereby make the start of transmission of encoded data of a slice row be aligned towards one transmission synchronization event SYNC and/or the end of transmission of encoded data of the slice row be aligned towards another transmission synchronization event SYNC. More specifically, compressed data transmission may be correlated to data compression, especially the compression ratio. The transmission synchronization event used for controlling transmission timing of one slice row may be a horizontal synchronization event or a vertical synchronization event, depending upon actual design consideration.

Figure 4:
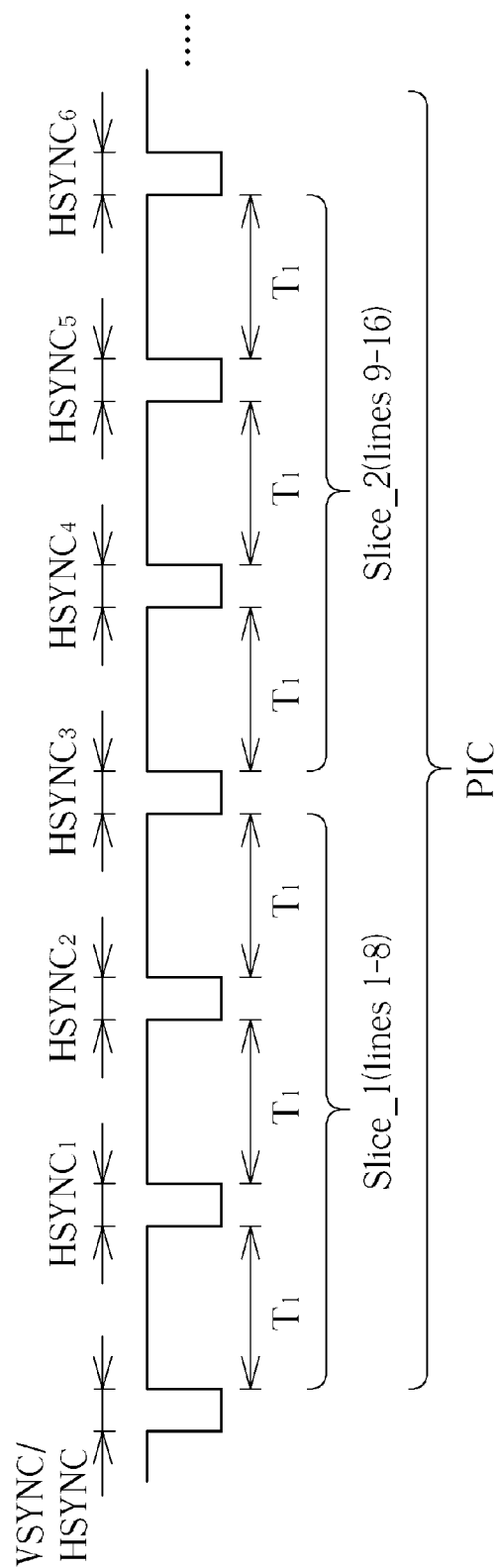
FIG. 4 is a diagram illustrating a compressed data transmission controlled by the output interface shown in FIG. 1 according to an embodiment of the present invention.

FIG. 4 is a diagram illustrating a compressed data transmission controlled by the output interface shown in FIG. 1 according to an embodiment of the present invention. Suppose that the slice height HS is set by 8. Hence, each of the slices has 8 lines (i.e., pixel rows). In this embodiment, the transmission rate and timing of the transmission channel 106 is adjusted by the transmission rate controller 116 according to the compression ratio CR of the compressed picture IMG', such that encoded data of each slice row is ensured to be transmitted within an integer number of transmission time slots that is smaller than the slice height (i.e., the number of lines in each slice row). In this example, the start of transmission of encoded data of a slice row is aligned towards one transmission synchronization event SYNC, and the end of transmission of encoded data of the slice row is aligned towards another transmission synchronization event SYNC. Hence, it is possible that partial encoded data of one slice row and partial encoded data of another slice row are not transmitted within the same transmission time slot. The output interface 104 may transmit the compressed picture IMG' by using a transmission time slot size originally used for transmitting the picture IMG. Hence, the size of data allowed to be transmitted in each transmission time slot with an active period $T_1$ may be equal to the size of original data of one line (i.e., one pixel row) in the picture IMG. Suppose that the compression ratio CR of the compressed picture IMG' is equal to ⅓. The output interface 104 transmits encoded data of one slice row (e.g., Slice_1 in FIG. 2) within three consecutive transmission time slots, and transmits encoded data of the next slice row (e.g., Slice_2 in FIG. 2) within three consecutive transmission time slots. As can be seen from FIG. 4, there is one horizontal synchronization event (e.g., HSYNC and $HSYNC_1$-$HSYNC_6$) at the end of each transmission time slot; in addition, there is one vertical synchronization event at the end of one entire picture (e.g., VSYNC). The output interface 104 properly controls timing of the transmission channel 106. In this way, the start of transmission of encoded data of the slice row (e.g., Slice_1 in FIG. 2) is aligned towards a horizontal synchronization event HSYNC generated due to the end of the last line in the previous entire picture or a vertical synchronization event VSYNC generated due to the end of the previous entire picture, and/or the end of transmission of encoded data of the slice row (e.g., Slice_1 in FIG. 2) is aligned towards a horizontal synchronization event $HSYNC_3$ generated due to the end of the last line in the slice row. The start of transmission of encoded data of another slice row (e.g., Slice_2 in FIG. 2) is aligned towards a horizontal synchronization event $HSYNC_3$ generated due to the end of the last line in the previous slice row, and/or the end of transmission of encoded data of another slice row (e.g., Slice_2 in FIG. 2) is aligned towards a horizontal synchronization event $HSYNC_6$ generated due to the end of the last line in the another slice row.

Further, to fully utilize the bandwidth of the transmission channel 106, the transmission rate of the transmission channel 106 may be derived from calculating $$\frac{\text{channel transmission rate}}{\text{bitrate of encoded data in one slice row}}$$

as a positive integer, where the value of the positive integer depends on the actual design consideration. Alternatively, the transmission rate of the transmission channel 106 may be derived from calculating $$\frac{\text{channel transmission rate}}{\text{bitrate of compressed picture } IMG'}$$

as a positive integer, where the value of the positive integer depends on the actual design consideration. The bitrate of encoded data in one slice row (or the bitrate of the compressed picture IMG') may be estimated using the compression-related parameters, including picture size, compression ratio, etc. It should be noted that the transmission clock should be adjusted accordingly. Moreover, since transmission synchronization events SYNC are also transmitted via the transmission channel 106, the setting of the transmission rate may further consider the channel bandwidth occupied by the transmission synchronization events SYNC. Besides, if the transmission channel is shared by multiple devices, the transmission rate also needs to be adjusted accordingly. In another embodiment, the initial transmission rate of the transmission channel 106 may be derived from calculating $$\frac{\text{channel transmission rate}}{\text{bitrate of compressed group line in a slice}}$$

as a positive integer, where the value of the positive integer depends on the actual design consideration. The bitrate of encoded data in one slice row may be estimated using the compression-related parameters, including picture size, compression ratio, etc. Then the transmission clock should be adjusted accordingly with consideration of synchronization event and transmission protocols.

In one exemplary implementation, an initial transmission rate of the transmission channel 106 may be set by a positive value which is an integer multiple of a bitrate of encoded data in one slice row, a bitrate of compressed picture IMG' or a bitrate of compressed group line in one slice. Next, the initial transmission rate of the transmission channel 106 may be fine tuned (e.g., increased or decreased) to a final transmission rate actually set to the transmission channel 106 for compressed data transmission based on certain factors taken into consideration. For example, the channel bandwidth occupied by the transmission synchronization events SYNC and/or whether the transmission channel is shared by multiple devices may be taken into consideration. Hence, the final transmission rate may not be necessarily divisible by bitrate of encoded data in one slice row/bitrate of compressed picture IMG'/bitrate of compressed group line in one slice. By way of example, a positive integer derived from applying a floor function (or a ceiling function) to $$\frac{\text{initial channel transmission rate}}{\text{bitrate of encoded data in one slice row}}$$

may be equal to $$\frac{\text{final channel transmission rate}}{\text{bitrate of encoded data in one slice row}};$$

a positive integer derived from applying a floor function (or a ceiling function) to $$\frac{\text{initial channel transmission rate}}{\text{bitrate of compressed picture } IMG'}$$

may be equal to $$\frac{\text{final channel transmission rate}}{\text{bitrate of compressed picture } IMG'};$$

and a positive integer derived from applying a floor function (or a ceiling function) to $$\frac{\text{initial channel transmission rate}}{\text{bitrate of compressed group line in a slice}}$$

may be equal to $$\frac{\text{final channel transmission rate}}{\text{bitrate of compressed group line in a slice}}.$$

However, this is for illustrative purposes only, and is not meant to be a limitation of the present invention.

Figure 5:
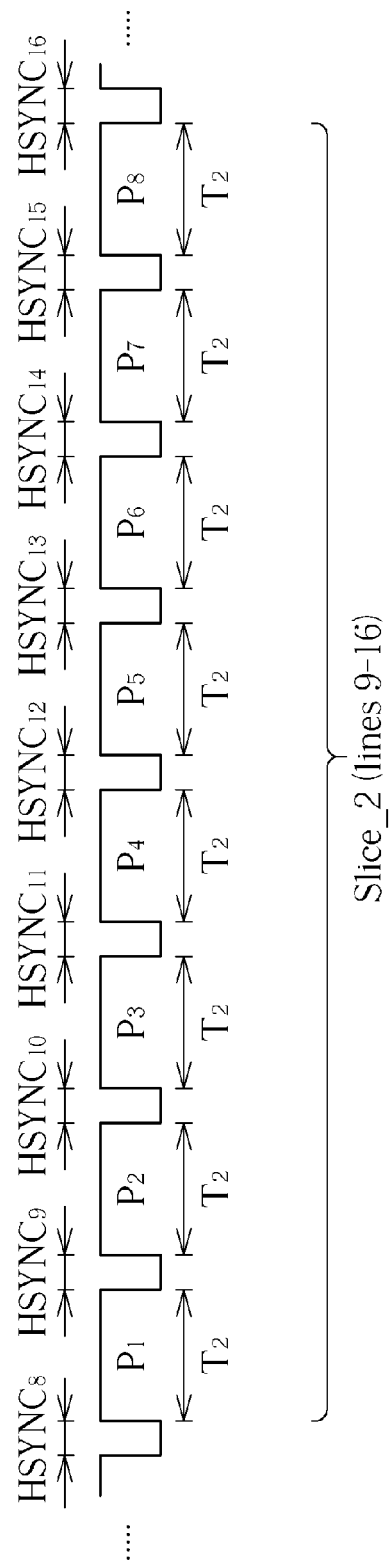
FIG. 5 is a diagram illustrating another compressed data transmission controlled by the output interface shown in FIG. 1 according to an embodiment of the present invention.

FIG. 5 is a diagram illustrating another compressed data transmission controlled by the output interface shown in FIG. 1 according to an embodiment of the present invention. In this example, the transmission rate and timing of the transmission channel 106 is adjusted by the transmission rate controller 116 according to the compression ratio CR of the compressed picture IMG', such that encoded data of each slice row is ensured to be transmitted within an integer number of transmission time slots that is equal to the slice height (i.e., the number of lines in each slice row). In this example, the start of transmission of encoded data of a slice row is aligned towards one transmission synchronization event SYNC, and the end of transmission of encoded data of the slice row is aligned towards another transmission synchronization event SYNC. Hence, partial encoded data of one slice row and partial encoded data of another slice row are not transmitted within the same transmission time slot.

For example, based on the picture size and the compression ratio, the output interface 104 knows the bit budget allocated to each of the slice rows (e.g., Slice_1-Slice_4 in FIG. 2), and then divides the bit budget by the number of lines in each slice row to determine the amount of encoded data required to be transmitted within one transmission time slot. Next, the transmission rate controller 116 of the output interface 104 may adjust transmission rate and timing of the transmission channel 106 to thereby make the start of transmission of encoded data of a slice row aligned towards one transmission synchronization event SYNC and/or the end of transmission of encoded data of the slice row aligned towards another transmission synchronization event SYNC.

In this example, the encoded data of one slice row (e.g., Sclice_2 in FIG. 2) is evenly divided into 8 payload sections $P_1$-$P_8$, such that the payload sections $P_1$-$P_8$ have the same size. As mentioned above, each slice includes a plurality of groups, and each group includes a plurality of pixels. The total size of all encoded group rows corresponding to the same slice row is equal to the bit budget allocated to compression of the slice row. However, due to lossy compression employed by the encoder 112, each of the encoded group rows may have different bitstream sizes. Hence, each of the payload sections $P_1$-$P_8$ may include encoded data belonging to the same group row only, or may include encoded data belonging to adjacent group rows. For example, the payload section $P_1$ may include all encoded data of group row 1 and partial encoded data of group row 2; and the payload section $P_2$ may include remaining encoded data of group row 2. For another example, the payload section $P_1$ may include all encoded data of group row 1 and partial encoded data of group row 2; the payload section $P_2$ may include another partial encoded data of group row 2; and the payload section $P_3$ may include remaining partial encoded data of group row 2.

As shown in FIG. 5, the size of data transmitted in each transmission time slot with an active period $T_2$ is equal to $$\frac{\text{bit budget allocated to one slice row}}{\text{slice height}}.$$

The output interface 104 transmits encoded data of the slice row (e.g., Slice_2 in FIG. 2) within eight transmission time slots. Specifically, the equal-sized payload sections $P_1$-$P_8$ are transmitted within the transmission time slots, respectively. As can be seen from FIG. 5, there is one horizontal synchronization event at the start of each transmission time slot. The transmission rate controller 116 of the output interface 104 properly controls transmission rate and timing of the transmission channel 106. In this way, the start of transmission of encoded data of the slice row (e.g., slice Slice_2 in FIG. 2) is aligned towards an $N^{th}$ horizontal synchronization event (e.g., $HSYNC_8$), and/or the end of transmission of encoded data of the slice row (e.g., Slice_2 in FIG. 2) is aligned towards an $(N+M)^{th}$ horizontal synchronization event (e.g., $HSYNC_{16}$), where M corresponds to the slice height. More specifically, the value of M is equal to the slice height.

Figure 6:
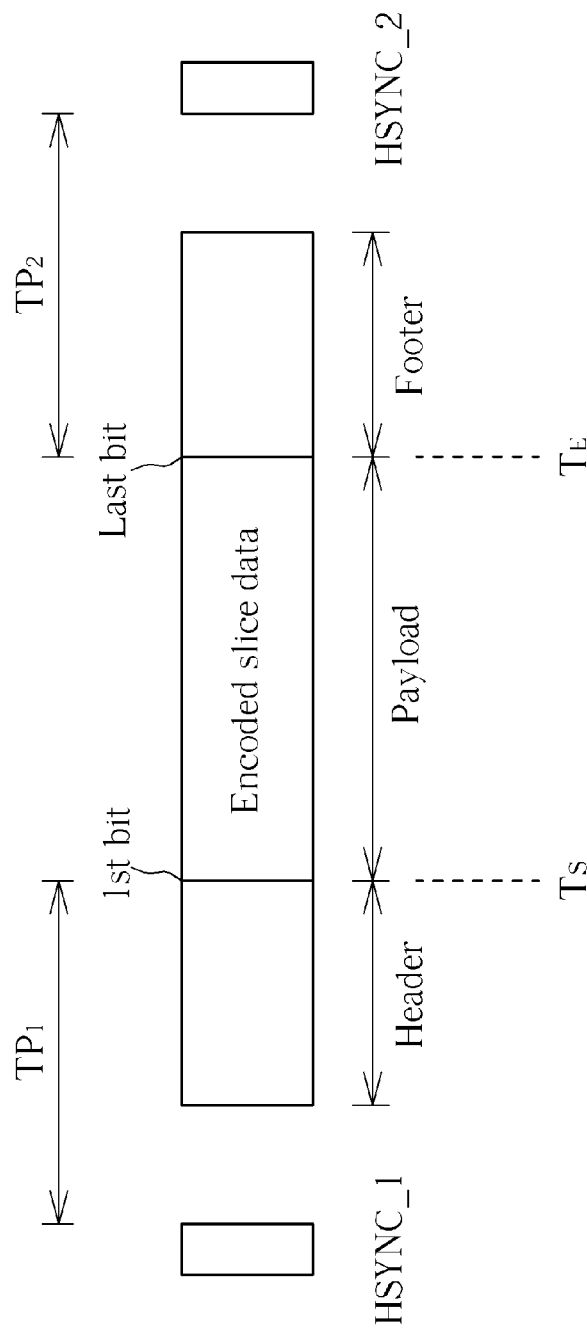
FIG. 6 is a diagram illustrating the operation of aligning at least one of start of transmission of encoded data of a slice row and end of the transmission of encoded data of the slice row towards a transmission synchronization event.

It should be noted that the aforementioned transmission timing alignment operation depends on the packet structure of the bitstream BS. FIG. 6 is a diagram illustrating the operation of aligning at least one of start of transmission of encoded data of a slice row and end of the transmission of encoded data of the slice row towards a transmission synchronization event. A data packet of the bitstream BS may include a header section, a payload section, and a footer section. The payload section is used to carry the encoded slice data. The header section is used to carry header information of the data packet and has a fixed length (e.g., 4 bytes). In addition, there may be other pre-defined comments/packets (e.g., HBP (Horizontal Back Porch) Packet) transmitted between a transmission synchronization event (e.g., HSS (Horizontal Sync Start) Packet) and the data packet (which carries encoded slice data). Hence, when the function of aligning start of transmission of encoded data of a slice row towards a transmission synchronization event is enabled, the output interface 104 determines the start time $T_S$ to ensure that an interval $TP_1$ between a preceding transmission synchronization event (e.g., a horizontal synchronization event HSYNC_1) and the start time $T_S$ of transmitting the encoded slice data (e.g., the timing when the first bit of encoded data of one slice row) is a predetermined value.

The footer section may be used to carry checksum information for CRC check and has a fixed length (e.g., 2 bytes). Similarly, when the function of aligning end of transmission of encoded data of a slice row towards a transmission synchronization event is enabled, the output interface 104 determines the end time $T_E$ to ensure that an interval $TP_2$ between a following transmission synchronization event (e.g., a horizontal synchronization event HSYNC_2) and the end time $T_E$ of transmission of encoded slice data (e.g., the last bit of encoded data of the slice row) is a predetermined value.

For example, the encoded data of one slice row shown in FIG. 4 is transmitted using three data packets, each having the packet structure shown in FIG. 6 and transmitted within one transmission time slot. Regarding the data packet transmitted within the first one of the three consecutive transmission time slots, the output interface 104 controls the start time of transmitting the first bit of encoded data of one slice row based on the predetermined time interval $TP_1$. Regarding the data packet transmitted within the last one of the three consecutive transmission time slots, the output interface 104 controls the end time of transmitting the last bit of encoded data of one slice row based on the predetermined time interval $TP_2$.

For another example, the packet sections $P_1$-$P_8$ shown in FIG. 5 are carried by a plurality of data packets, each having the packet structure shown in FIG. 6. Regarding the data packet carrying the payload section $P_1$, the output interface 104 controls the start time of transmitting the first bit of encoded data of one slice row based on the predetermined time interval $TP_1$. Regarding the data packet carrying the payload section $P_8$, the output interface 104 controls the end time of transmitting the last bit of encoded data of one slice row based on the predetermined time interval $TP_2$.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. An image processing, comprising:
    partitioning a picture into a plurality of slices, wherein each slice row in the picture includes at least one slice;
    generating a compressed picture by using a lossy compression method with a fixed rate control method applied thereto for encoding each of the slices, wherein the fixed rate control method assigns a same bit budget to said each of the slices, and a ratio of a size of encoded data of said each of the slices to a size of original data of said each of the slices is equal to a compression ratio of the compressed picture; and
    controlling at least one of start of transmission of encoded data of a slice row and end of the transmission of encoded data of the slice row according to a transmission synchronization event, comprising:
        adjusting transmission rate and time of a transmission channel according to the compression rate of the compressed picture, wherein encoded data of the slice row is transmitted over the transmission channel; and
        adjusting transmission rate and timing of the transmission channel for aligning at least one of the start and the end of the transmission of encoded data of the slice row towards the transmission synchronization event, wherein the transmission synchronization event is one of a horizontal synchronization event and a vertical synchronization event.

2. The image processing method of claim 1, wherein the transmission synchronization event is a horizontal synchronization event.

3. The image processing method of claim 1, wherein the transmission synchronization event is a vertical synchronization event.

4. The image processing method of claim 1, wherein encoded data of the slice row is transmitted over the transmission channel, and the step of aligning at least one of the start of the transmission of encoded data of the slice row and the end of the transmission of encoded data of the slice row towards the transmission synchronization event comprises:
    adjusting transmission rate and timing of the transmission channel for aligning the start of the transmission of encoded data of the slice row towards the transmission synchronization event and aligning the end of the transmission of encoded data of the slice row towards another transmission synchronization event.

5. The image processing method of claim 4, wherein the transmission synchronization event is an $N^{th}$ transmission synchronization event, the another transmission synchronization event is an $(N+M)^{th}$ transmission synchronization event, N and M are positive integers, and M corresponds to a slice height of the slice row.

6. The image processing method of claim 1, wherein the transmission of encoded data of the slice row is controlled to start or end at a specific time point, wherein an interval between the specific time point and the transmission synchronization event is a predetermined value.

7. An image processing apparatus, comprising:
    a compressor, configured to partition a picture into a plurality of slices, and generate a compressed picture by encoding each of the slices, wherein each slice row in the picture includes at least one slice, and the compressor comprises:
    a rate controller, configured to perform a fixed rate control method which assigns a same bit budget to said each of the slices; and
    an encoder, configured to generate the compressed picture by a lossy compression method with the fixed rate control method applied thereto, wherein a ratio of a size of encoded data of said each of the slices to a size of original data of said each of the slices is equal to a compression ratio of the compressed picture; and
    an output interface, configured to control at least one of start of transmission of encoded data of a slice row and end of the transmission of encoded data of the slice row according to a transmission synchronization event, wherein encoded data of the slice row is transmitted over a transmission channel, and the output interface adjusts transmission rate and timing of the transmission channel according to the compression ratio of the compressed picture; and
    adjusting transmission rate and timing of the transmission channel for aligning at least one of the start and the end of the transmission of encoded data of the slice row towards the transmission synchronization event, wherein the transmission synchronization event is one of a horizontal synchronization event and a vertical synchronization event.

8. The image processing apparatus of claim 7, wherein the transmission synchronization event is a horizontal synchronization event.

9. The image processing apparatus of claim 7, wherein the transmission synchronization event is a vertical synchronization event.

10. The image processing apparatus of claim 7, wherein encoded data of the slice row is transmitted over the transmission channel; and the output interface comprises a transmission rate controller configured to adjust transmission rate and timing of the transmission channel for aligning the start of the transmission of encoded data of the slice row towards the transmission synchronization event and aligning the end of the transmission of encoded data of the slice row towards another transmission synchronization event.

11. The image processing apparatus of claim 10, wherein the transmission synchronization event is an $N^{th}$ transmission synchronization event, the another transmission synchronization event is an $(N+M)^{th}$ transmission synchronization event, N and M are positive integers, and M corresponds to a slice height of the slice row.

12. The image processing apparatus of claim 7, wherein the output interface controls the transmission of encoded data of the slice row to start or end at a specific time point, and an interval between the specific time point and the transmission synchronization event is a predetermined value.

13. A method of transmitting a compressed picture comprising partitioning a picture into multiple slices;
    compressing the picture by encoding each of slices according to a fixed rate control method with a compression ratio, wherein the fixed rate control method assigns a same bit budget to said each of the slices, and a ratio of a size of encoded data of said each of the slices to a size of original data of said each of the slices is equal to the compression ratio; and
    controlling transmission of compressed data of a vertical adjacent slice to synchronize with a synchronization event, comprising:
        adjusting transmission rate and timing of a transmission channel according to the compression ratio, wherein the compressed data of the vertical adjacent slice is transmitted over the transmission channel; and
        adjusting transmission rate and timing of the transmission channel for aligning at least one of the start and the end of the transmission of encoded data of the slice row towards the transmission synchronization event, wherein the transmission synchronization event is one of a horizontal synchronization event and a vertical synchronization event.

\* \* \* \* \*